(12) United States Patent
Ke et al.

(10) Patent No.: US 7,821,595 B2
(45) Date of Patent: Oct. 26, 2010

(54) BACKLIGHT MODULE

(75) Inventors: Therm-Hoo Ke, Hsin-Chu (TW); Ying-Feng Hsu, Hsin-Chu (TW); Chi-Chun Yang, Hsin-Chu (TW); Li-Chuan Yu, Hsin-Chu (TW); Tzu-Yi Liu, Hsin-Chu (TW); Tung-Liang Shao, Hsin-Chu (TW); Tung-I Yen, Hsin-Chu (TW); Shih-Chang Chang, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 0 days.

(21) Appl. No.: 12/791,951

(22) Filed: Jun. 2, 2010

(65) Prior Publication Data

US 2010/0238371 A1 Sep. 23, 2010

Related U.S. Application Data

(63) Continuation of application No. 12/042,542, filed on Mar. 5, 2008, now Pat. No. 7,782,418.

(30) Foreign Application Priority Data

Jul. 4, 2007 (TW) .............................. 96124346 A

(51) Int. Cl.
*G02F 1/1333* (2006.01)

(52) U.S. Cl. .............................. 349/58; 349/65; 349/67; 362/609; 362/623; 362/632; 362/633; 362/634

(58) Field of Classification Search ................... 349/67; 362/609, 623, 632–634
See application file for complete search history.

(56) References Cited

U.S. PATENT DOCUMENTS

| 5,280,372 | A | 1/1994 | Horiuchi |
| 6,513,944 | B2 | 2/2003 | Chou |
| 6,935,766 | B2 * | 8/2005 | Ato ............................ 362/633 |
| 7,104,671 | B2 | 9/2006 | Tseng et al. |
| 7,440,046 | B2 | 10/2008 | Kang et al. |
| 2004/0190308 | A1 | 9/2004 | Chang et al. |
| 2007/0047265 | A1 | 3/2007 | Kang et al. |

FOREIGN PATENT DOCUMENTS

| TW | 226494 | 1/2005 |
| TW | M256503 | 2/2005 |
| TW | 200611027 | 4/2006 |

* cited by examiner

*Primary Examiner*—Richard H Kim
(74) *Attorney, Agent, or Firm*—Thomas, Kayden, Horstemeyer & Risley, LLP

(57) ABSTRACT

A backlight module includes a frame, an optical element, a bottom plate, a holder, and a light source. The optical elements are located on the frame and a space between the sidewall of the frame and the optical elements. The bottom plate located under the optical elements. The light source is on the holder inserted into the space, The holder is inserted into the space along the direction toward the bottom surface of the bottom plate, and is removed from the space along the opposing direction.

24 Claims, 5 Drawing Sheets

BACKLIGHT MODULE

RELATED APPLICATIONS

This application is a continuation application of U.S. application Ser. No. 12/042,542, filed on Mar. 5, 2008, which claims priority to Taiwan Application Serial Number 96124346, filed Jul. 4, 2007, both of which are herein incorporated by reference.

BACKGROUND

1. Field of Invention

The present invention relates to a backlight module. More particularly, the present invention relates to a backlight module with an easily detachable backlight source.

2. Description of Related Art

With the advance of photoelectrical technologies and the maturity of digital life in a couple of years, the market of liquid crystal display (LCD) has been greatly promoted. The LCD with the advantages of high image quality, small size, light weight, low voltage driving and low power consumption are widely applied for consumer communication and electrical products, for example, personal data assistant (PDA), mobile phone, recorder player, notebook, laptop display, head-up display, and projected television etc., instead of cold cathode fluorescent lamp (CCFL), and then becomes the main trends in display.

LCD is a display device that utilizes the characteristic of liquid crystal to achieve the function of display. Since it is more flexible in both size and weight than conventional display utilizing CCFL, LCD can be applied to various systems from small devices (e.g., displays in cellular phones or personal digital assistants) to large displays like televisions or even giant advertisement displays. Hence, we can see LCD everywhere in our life.

The design of LCD display is current toward light weight and small volume, especially for the mobile device, for example, the LCD display of notebook computer, PDA, and cell phone, etc. At the same time, the cost reduction of the materials and manufacturing is an inevitable trend, wherein the system designs due to light weight and small volume of LCD panel conflict with its structure strength.

The light source as conventional backlight module is usually used as CCFL, and is classified into two types: edge lighting and bottom lighting, according to incident location of the light source. Above all applied in the field of information, communication, and consumer products provide one surface of the light source. The edge lighting of backlight module is a preferred option for the products due to the weight consideration.

The technology for the installing light source of backlight source may extend the life of LCD. FIG. 1 is a schematic of the light source of backlight module for the prior art in edge installing. As referred in FIG. 1, the sidewall of backlight module 15 is with the guide slot 22. The light source 25 comprising the loading section 19 is located within the lamp 14. The light source 25 is slipped into the sidewall of backlight module along the guide slot 22. In conclusion, installing edge and bottom of backlight module needs a larger work platform while changing the light source. Additionally, it is not convenient for installing the backlight module of back installing with the back steel frame to fix the edge light source. It needs better design for faster installing light source relative to the current back installing method.

SUMMARY

The present invention provides a bottom installed backlight module. The bottom installed backlight module comprises: a frame, an optical element, a bottom plate, a holder, and a light source. The optical element is located on the frame and an accommodation space between the sidewall of the frame and the optical element. The bottom plate disposed under the optical elements combines with the frame. After installing the bottom plate, it partially exposes the accommodation space with the distance between the sidewall of the bottom plate and the frame. The light source is disposed on the holder. The holder engaged with the frame and the bottom of the bottom plate shields the space. The holder selectively engages or disengages with the frame along a direction that is perpendicular to bottom surface of the bottom plate. The optical element at least comprises a guide light plate.

The present invention further comprises a foregoing LCD of backlight module, where the driver circuit disposed on the LCD panel, and embedded into the frame, and disposed on the optical elements.

The present invention further comprises a foregoing photoelectric apparatus of LCD.

The backlight module provided by the present invention, maybe have the light-reflective coating layer disposed on the accommodation space, the upper and side of inner edge of the frame, and within the holder. The reflection of light source emitted may be more effectively directed into the light guide plate by the light-reflective coating layer. The coating for the light-reflective layer is whether or not determined by the structure of the holder and the optical efficiency. The optical element further comprises a diffuser plate on the light guide plate and a polarizing sheet on the diffuser plate.

Since the bottom plate disposes under the light guide plate and stretches into the accommodation space, the bottom plate can substantially expose or partially shield the accommodation space. The cross-section of the holder can be the shape of "L", "U", or "I". The holder is installed on the frame in the direction that is perpendicular of the bottom.

The light-reflective coating layer also coated inside the bottom plate directs the light source emitted from the accommodation space into the light guide plate. The method for the holder located within the frame and on the bottom plate comprises the sidewall of the holder and the bottom plate including the ear clip on the sidewall of the holder, wherein combines with the hole on the bottom plate. The holder may include metals materials or nonconductive materials. The nonconductive materials can be polyethylene, polycarbonate, polyacrylate, or copolymer of acrylonitrile, butadiene and styrene. When the holder is made of the nonconductive materials, it is to lower the leaking current in light source module and further provides the usage life thereof.

In present invention, the light source may be used as the CFFL, or light emitted diode.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
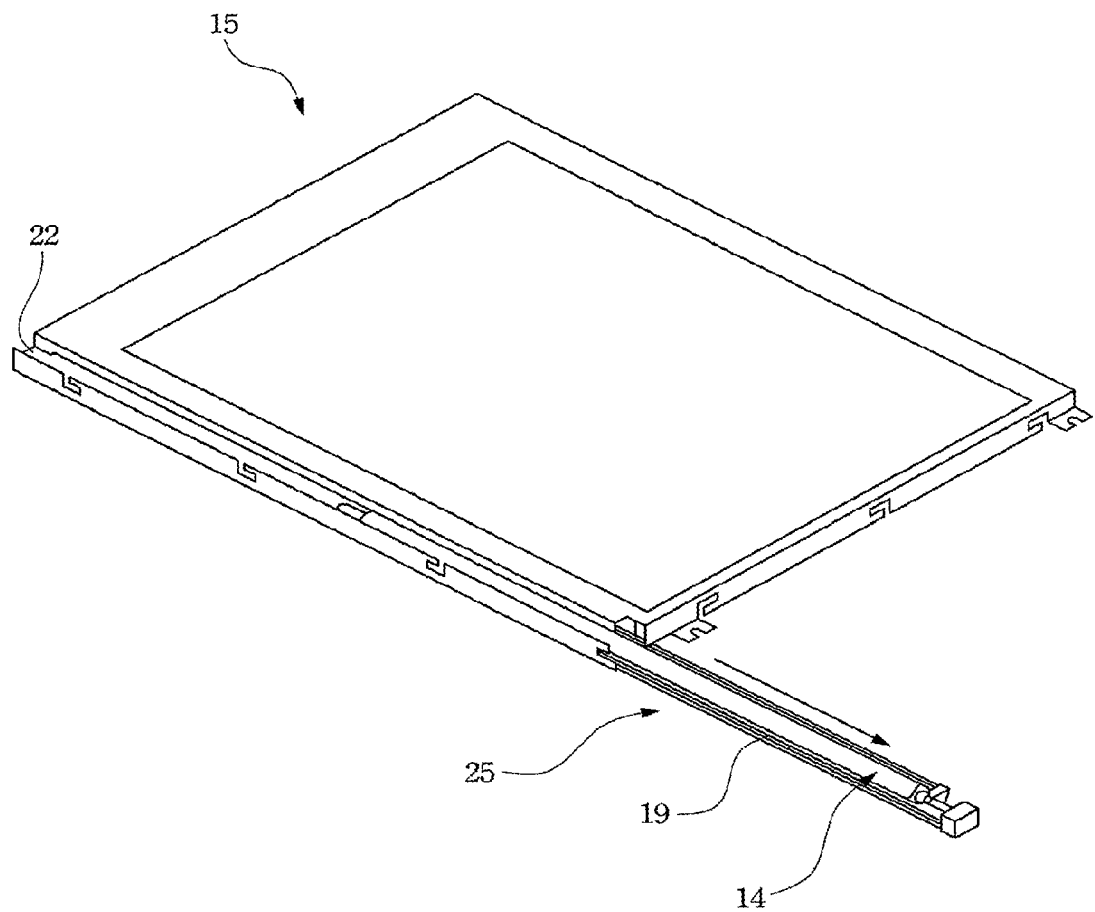
FIG. 1 is a known structural view of the edge backlight module for easily detachable light source.

Reference will now be made in detail to the present embodiments of the invention, examples of which are illustrated in the accompanying drawings. Wherever possible, the same reference numbers are used in the drawings and the description to refer to the same or like parts.

The present invention provides three or more different cross-sections of the holder, for example, the shape of "L", the shape of "U", or the shape of "I", but there are still another cross-sections of the holder to be intended to achieve the purpose of the present invention. It is better understood that following invention provides several embodiments.

Figure 2:
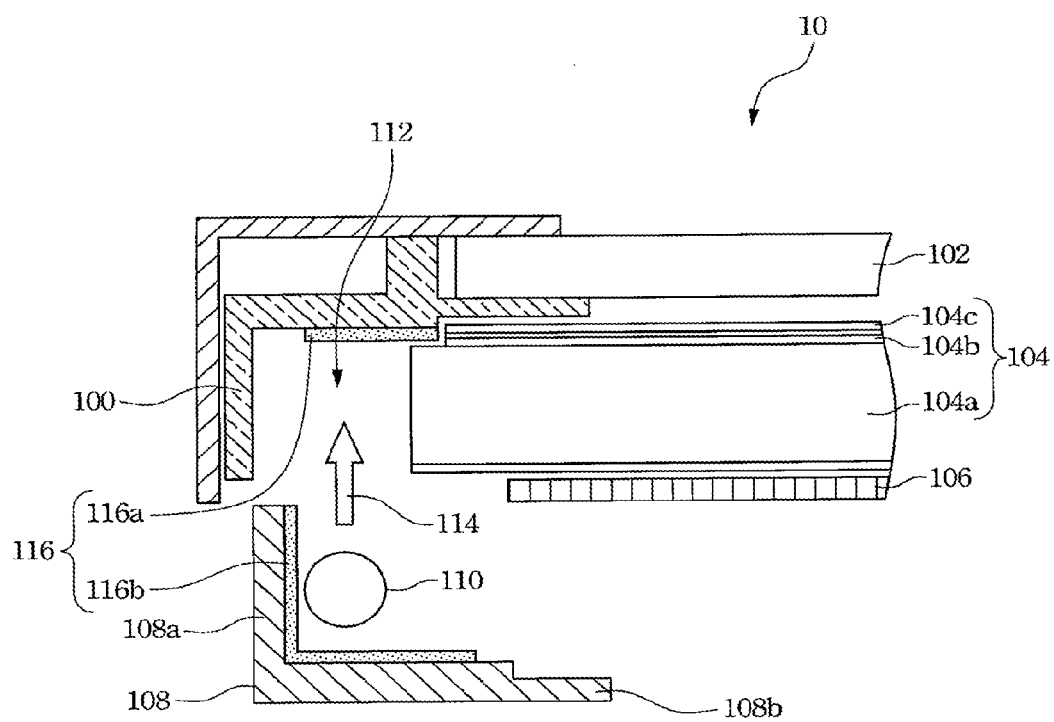
FIG. 2 is a portion of sectional view according to one embodiment of this invention.

Referring to FIG. 2, there is a portion of the schematic view of one preferred embodiment of the present invention. An LCD 10 comprises: a frame 100, a liquid crystal display panel 102, an optical element 104, a bottom plate 106, a holder 108, and a light source 110. The frame 100 is a supporting structure. The liquid crystal display panel 102 is equipped with the driver circuit (not shown), which is embedded into the frame 100. The optical element 104 is located under the frame 100. The bottom plate 106 is located under the optical element 104. Thus, the optical element 104 is held between the bottom 106 and the frame 100.

There is an accommodation space 112 between the optical element 104 and an inner sidewall of the frame 100. When the bottom plate 106 combines with the frame 100, the bottom plate 106 at least partially exposes the accommodation space 112. In this embodiment, it completely exposes the accommodation space 112. There is a light source 110 disposed on the inner edge of the holder 108. The holder 108 engages with the frame 100 and the bottom edge of the bottom plate 106 along a direction 114 so as to shield the accommodation space 112. In this embodiment, the moving of the holder 108 along the direction 114 (perpendicular to a bottom surface of the bottom plate 106) is defined as "vertically upward"; the moving of the holder 108 along the opposite direction 114 is defined as "vertically downward". The optical element 104 comprises a guide light plate 104a and a diffuser plate 104b, located on the guide light plate 104a. The optical element 104 further comprises a polarizing sheet 104c located on the diffuser plate 104b.

In this embodiment, a light-reflective coating layer 116a is formed on an inner wall of an upper edge of the frame 100, and a light-reflective coating layer 116b is formed on an inner wall of the holder 108. Two light-reflective coating layers 116a/116b effectively guide the light emitted from the light source 110, which is located within the accommodation space 112, into the optical element 104.

When the holder 108 goes vertically upward and then combines with the bottom plate 106 and the frame 100, the sidewall of the holder 108 supports the sidewall of the frame 100, and the bottom of the holder 108 matches with the bottom of the bottom plate 106. In present embodiment, the holder 108 is screwed on or adhered on the bottom plate 106.

Figure 3:
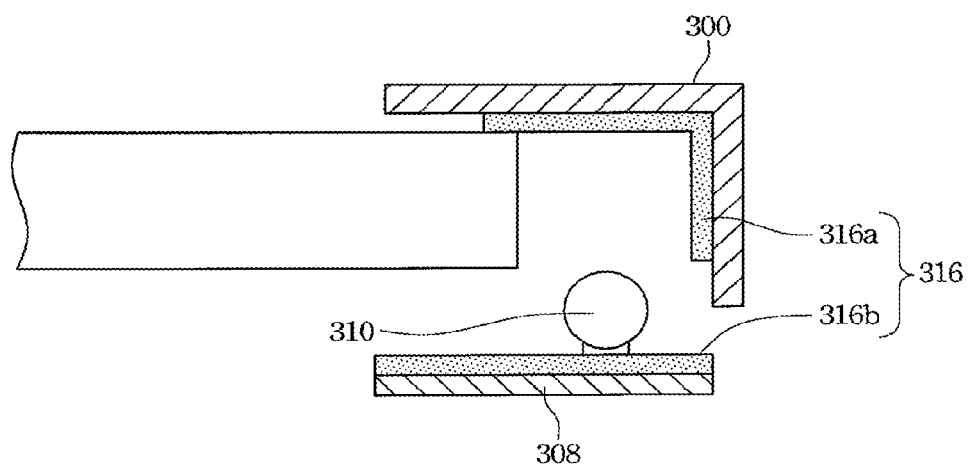
FIG. 3-FIG. 4 are the portion of sectional schematics according to another embodiment of this invention.
Figure 4:
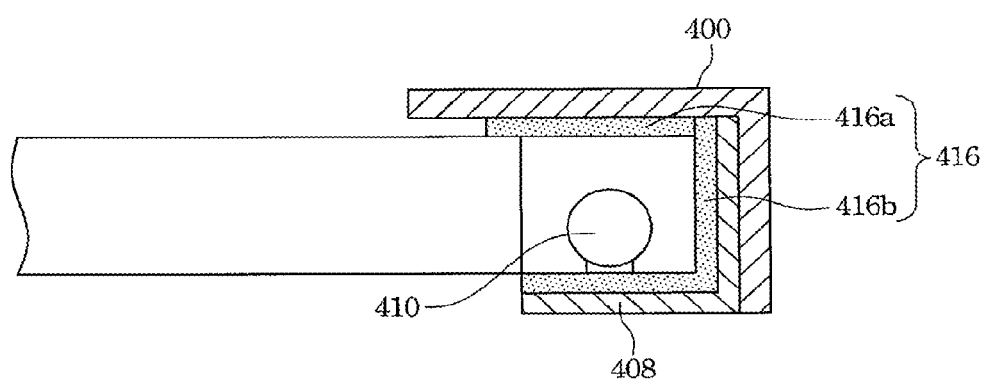

Referring to FIG. 3 and FIG. 4, there are portions of schematic views of another preferred embodiment of the present invention. In the FIG. 3, the cross-section of the holder 308 is the shape of "I", and meanwhile, the light-reflective coating layer 316a not only disposed on the upper inner wall of the frame 300, but also on the side inner sidewall of the frame 300, and the light-reflective coating layer 316b is disposed on the surface of the holder 308, where the light source 310 is disposed. The light-reflective layers 316a and 316b form the complete light-reflective coating layer 316. In the FIG. 4, the cross-section of the holder 408 is the shape of inverted "L". The light-reflective coating layer 416a is disposed on the upper inner wall of the frame 400, and the light-reflective coating layer 416b is disposed on the inner side of the holder 408, where the light source 410 is disposed. The light-reflective layers 416a and 416b forms the complete light-reflective coating layer 416.

Figure 5:
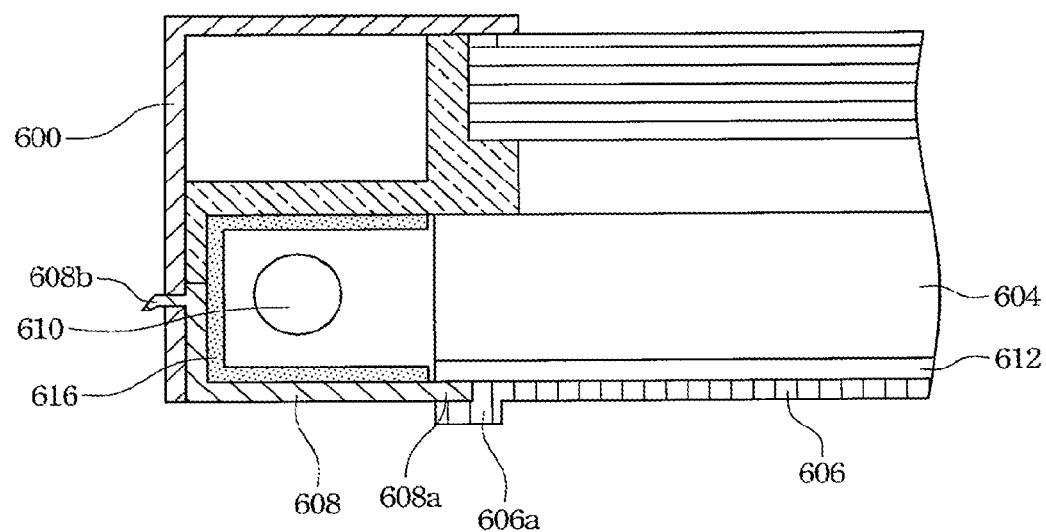
FIG. 5 is a sectional schematic diagram of the holder configured on the backlight module according to the example of ear clip.

The light source assemblies (the assembly of the light source and the holder) discussed in previous embodiments are all directly installed into the backlight module along the direction toward the bottom plate (i.e. vertically upward). On the other hand, the light source assembles (the assembly of the light source and the holder) can be directly removed from the backlight module along the opposite direction toward the bottom plate (i.e. vertically downward). The light source assembly is inserted and fixed into the frame with an ear clip on the sidewall of the holder retained with the hole on the bottom, or by screwing and adhesive method. In the FIG. 5, it is a sectional schematic diagram of how the ear clip installed on the backlight module. Referred to FIG. 5, there is at least an opening on the frame 600 (not shown), and an ear clip 608b on one end of the holder 608. When the holder 608 with the light source 610 goes vertically upward into the accommodation space (between the frame 600 and the light guide plate 604), one end 608a of the holder 608 is embedded into the space defined between one end 606a of the bottom plate 606 and the reflective plate 612. Next, when one end of the ear clip 608b on the holder 608 is pushed vertically upward, the ear clip 608b will be slipped into the opening on the frame 600. The holder 608 can be fixed on the frame 600 by the end 608a and the ear clip 608a. When the holder 608 and the frame 600 needs to be taken apart, lifting the ear clip 608b can easily detach the holder 608 from the frame 600.

Additionally, referred as the light source of backlight in the FIG. 2, when the holder 108 goes vertically upward and installs into in the backlight module, one end 108a of outer sidewall of the holder 108 reaches the inner edge of sidewall of the frame; one end 108b of the holder 108 combines with the bottom plate 106 by screwing (not shown) or adhesion (not shown).

The various advantages for utilizing the backlight module by the present invention are easily installed in backlight module, not only to promote the usage life of LCD provided by backlight module, but also to lower cost in the effective way. When the holder is used as the metals, it is in order to increase the heat dissipation of light source; otherwise, when the holder is used as the nonconductive metals, it is in order to lower the leaking current of light source. The table below shows the numerical results measured by the first embodiment and conventional backlight module. The holder in the first embodiment is used as polyacrylate.

| | Backlight module | Power Frequency (KHz) | Input Current (mA) | Output Current (mA) | Brightness (nit) |
|---|---|---|---|---|---|
| A | Conventional | 55 | 7.73 | 6.00 | 248 |
| | Embodiment herein | 55 | 6.85 | 6.00 | 255 |
| B | Conventional | 46 | 6.36 | 5.00 | 200 |
| | Embodiment herein | 46 | 6.4 | 6.00 | 249 |

As illustrated in the table above, we set power frequency as 55 KHz and output current as 6 mA in the group A, and then we can observe that the conventional backlight module needs more than 13% of input current to have a similar brightness as embodiment herein. In the group B, we change to set power frequency as 46 KHz and input current as 6.4 mA. In this experiment, the measured output current of conventional backlight module is 17% less than the input current of the embodiment of this invention, whereas the brightness of the invention embodiment is 25% higher than the conventional module. All these results prove that the embodiment of this invention can restrain the leak of electric current of light module.

In the present invention, the frame is selected from the materials comprising plastics (ex. thermosetting, thermoplastic, or the combination of the two), metals (ex. Al, Mg, Cu, Fe, Sn, or another), metal composites (ex. Al, Mg, Cu, Fe, Sn, Zn, Oxide, Nitride, Nitrogen oxides, or another, or the combinations of these), or the combination of the foregoing. The optical elements further comprise diffuser plate, prism sheet, brightness enhancement films, wavelength choosing plate, light transparent reflective plate or optical films of another functions.

In addition, the present invention provides the light source comprising the fluorescent lamp; light emitted display, field emitting light (FEL), organic electrical light display (OELD), Light Emitting Diode (LED) and etc., wherein fluorescent lamp is as example of CCFL, EEFL, HCFL, and the cross-section of fluorescent lamp comprises the shape of straight line, "L", "U", bending or another shape; OELD is organic light emitted diode (OLED).

Furthermore, the present invention providing display device of backlight module may comprise a single display device of one display surface, or two or more multiple display devices of display surfaces. The display panel is the liquid crystal display panel comprising a transparent panel, a half transparent panel, a reflective panel, a dual-display panel, a vertical alignment (VA) panel, a in-plain switch (IPS) panel, a multiple vertical alignment (MVA) panel, a twisted nematic (TN) panel, a super twisted nematic (STN) panel, a pattern vertical alignment (PVA) panel, a supper pattern vertical alignment (S-PVA) panel, an advanced supper view (ASV) panel, a fringe field switching (FFS) panel, a continuous pinwheel alignment (CPA) panel, an axially symmetrical alignment microcell (ASM) panel, an optical compensated bend (OCB) panel, a supper in plain switching (S-IPS) panel, an advanced supper-in plain switching (AS-IPS) panel, a ultra fringe field switching (UFFS) panel, a polymer stable alignment (PSA) panel, a dual-view, a triple-view panel, or the others panel, or a combination of the foregoing.

Figure 6:
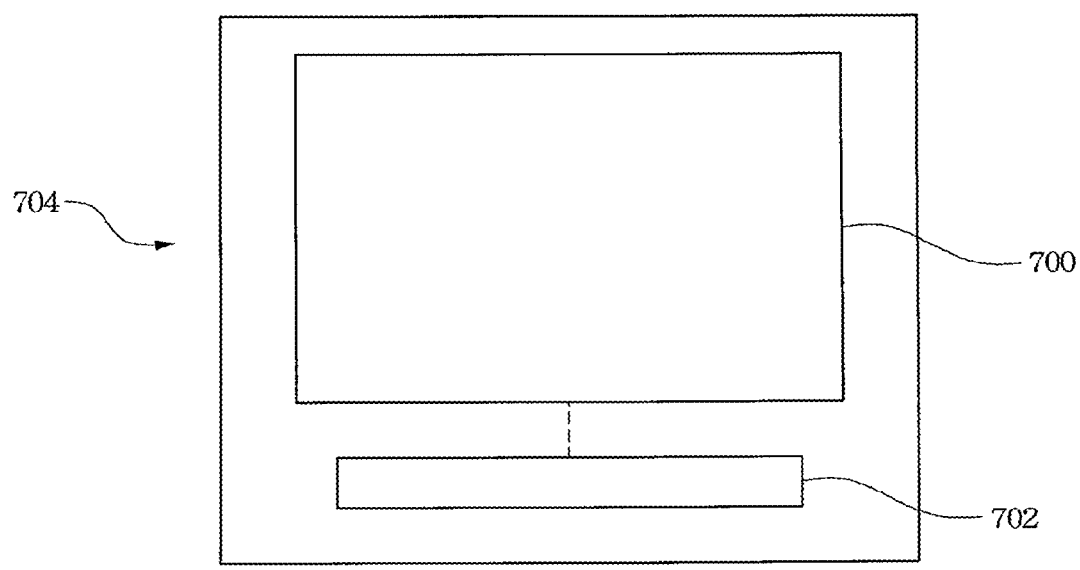
FIG. 6 is a schematic of photoelectrical apparatus manufactured by the display apparatus according to the forgoing description.

Furthermore, referring to FIG. 6, it illustrates a schematic view of photoelectrical device manufactured by the foregoing display device. The display device 700 formed by the foregoing embodiment may be connected with electrical element 702 such that a combination of the display device 700 and the electrical 702 becomes a photoelectrical device 704. The electrical element 702 comprises control element, operation element, process element, input element, memory element, driver element, protection element, sensor element, detection element, or elements of another function, or the combination of the foregoing. The photoelectrical device comprises mobile product (ex. cell phone, recording camera, photo camera, notebook computer, game machine, electrical watch, PDA, GPS, and similar products etc.), audio and video product (ex. audio and video player, or similar products etc.), screen, television, the panel inside the projector etc.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A backlight module comprising:
a frame;
an optical element located within the frame, and an accommodation space defined between at least one sidewall of the frame and the optical element;
a bottom plate disposed under the optical element, and secured to the frame;
a holder disposed under the frame and the bottom plate, and shielding the accommodation space; and
a light source disposed on the holder located within the accommodation space;
wherein when the light source is being replaced, the holder disengages with the frame along a direction that is perpendicular to a bottom surface of the bottom plate without removing the frame and bottom plate.

2. The backlight module of claim 1, wherein the upper inner edge of the frame comprises a first light-reflective coating layer.

3. The backlight module of claim 1, wherein the side inner edge of the frame comprises a second light-reflective coating layer.

4. The backlight module of claim 1, wherein the inner wall of the holder comprises a third light-reflective coating layer.

5. The backlight module of claim 4, wherein the holder comprises metal materials.

6. The backlight module of claim 4, wherein the holder comprises nonconductive materials.

7. The backlight module of claim 1, wherein the optical element comprises a light guide plate.

8. The backlight module of claim 7, wherein the optical element comprises a diffuser plate disposed on the light guide plate and a polarizing sheet disposed on the diffuser plate.

9. The backlight module of claim 8, wherein the bottom plate stretches from the light guide plate into the accommodation space to at least shield part of the accommodation space.

10. The backlight module of claim 1, wherein the light source comprises a cold cathode fluorescent lamp or a light emitting diode.

11. A liquid crystal display comprising:
a frame;
a liquid crystal display panel disposed in the frame;

an optical element located within the frame, and disposed under the liquid crystal display panel, and an accommodation space defined between at least one side inner edge of the frame and the optical element;

a bottom plate disposed under the optical elements, and secured to the frame;

a holder engaging within the frame and the bottom edge of the bottom plate, and shielding the accommodation space; and a light source disposed on the holder located within the accommodation space;

wherein when the light source is being replaced, the holder disengages with the backlight module along a direction that is perpendicular to a bottom surface of the bottom plate without removing the frame and bottom plate.

12. The liquid crystal display of claim 11, wherein the upper inner edge of the frame comprises a first light-reflective coating layer.

13. The liquid crystal display of claim 11, wherein the inner edge of the frame comprises a second light-reflective coating layer.

14. The liquid crystal display of claim 11, wherein the inner wall of the holder comprises a third light-reflective coating layer.

15. The liquid crystal display of claim 14, wherein the holder comprises metal materials.

16. The liquid crystal display of claim 14, wherein the holder comprises nonconductive materials.

17. The liquid crystal display of claim 11, wherein the optical element comprises a light guide plate.

18. The liquid crystal display of claim 17, wherein the optical element comprises a diffuser plate disposed on the light guide plate and a polarizing sheet disposed on the diffuser plate.

19. The liquid crystal display of claim 18, wherein the bottom plate stretches from the light guide plate into the accommodation space to at least shield part of the accommodation space.

20. The liquid crystal display of claim 11, wherein the light source comprises a cold cathode fluorescent lamp or a light emitting diode.

21. A backlight module comprising:
a frame comprising a first light-reflective coating layer;
an optical element located within the frame;
a bottom plate disposed under the optical element, and secured to the frame;
a reflective plate sandwiched between the optical element and the bottom plate;
a holder disposed under the frame and the bottom plate and comprising a second light-reflective coating layer; and
a light source;
wherein the holder selectively engages or disengages with the frame along a direction that is perpendicular to a bottom surface of the bottom plate, when the holder engages with the frame, the first, second light-reflective coating layers and the reflective plate collectively define a reflective surface for the light source and optical element.

22. A liquid crystal display comprising:
a frame comprising a first light-reflective coating layer;
a liquid crystal display panel disposed in the frame;
an optical element located within the frame, and disposed under the liquid crystal display panel;
a bottom plate disposed under the optical elements, and secured to the frame;
a reflective plate sandwiched between the optical element and the bottom plate;
a holder disposed within the frame and the bottom edge of the bottom plate, wherein the holder comprises a second light-reflective coating layer; and
a light source for illuminating the liquid crystal display panel;
wherein the holder selectively engages or disengages with the backlight module along a direction that is perpendicular to a bottom surface of the bottom plate, when the holder engages with the backlight module, the first, second light-reflective coating layers and the reflective plate collectively define a reflective surface for the light source and optical element.

23. A backlight module comprising:
a frame comprising a first light-reflective coating layer;
an optical element located within the frame;
a bottom plate disposed under the optical element, and secured to the frame;
a holder disposed under the frame and the bottom plate and comprising a second light-reflective coating layer, wherein the holder and the bottom plate collectively form a shield to cover a bottom side of the optical element; and
a light source;
wherein the holder selectively engages or disengages with the frame along a direction that is perpendicular to a bottom surface of the bottom plate, when the holder engages with the frame, the first, second light-reflective coating layers and the optical element collectively define an accommodation space to enclose the light source.

24. A liquid crystal display comprising:
a frame comprising a first light-reflective coating layer;
a liquid crystal display panel disposed in the frame;
an optical element located within the frame, and disposed under the liquid crystal display panel;
a bottom plate disposed under the optical elements, and secured to the frame;
a holder disposed within the frame and the bottom edge of the bottom plate, wherein the holder comprises a second light-reflective coating layer, wherein the holder and the bottom plate collectively form a shield to cover a bottom side of the optical element; and
a light source for illuminating the liquid crystal display panel;
wherein the holder selectively engages or disengages with the backlight module along a direction that is perpendicular to a bottom surface of the bottom plate, when the holder engages with the backlight module, the first, second light-reflective coating layers and the optical element collectively define an accommodation space to enclose the light source.

* * * * *